United States Patent [19]

Pettijohn

[11] Patent Number: 5,193,971
[45] Date of Patent: Mar. 16, 1993

[54] MOBILE HYDRAULIC CONVEYOR

[76] Inventor: Michael J. Pettijohn, 15111 Oak Rd., Carmel, Ind. 46032

[21] Appl. No.: 843,222

[22] Filed: Feb. 28, 1992

[51] Int. Cl.$^5$ ............................................. B60P 1/36
[52] U.S. Cl. ...................................... 414/523; 414/528; 414/687; 414/744.2; 212/245; 198/317; 198/861.5
[58] Field of Search .............. 414/523, 502, 503, 504, 414/505, 528, 489, 744.7, 687; 198/317, 861.5 X, 861.1, 632, 315, 316.1, 318, 861.4, 861.6; 212/245

[56] References Cited

U.S. PATENT DOCUMENTS

| | | | |
|---|---|---|---|
| 2,107,682 | 2/1938 | Wall | 414/523 X |
| 2,609,115 | 9/1952 | Oklejas | |
| 2,834,487 | 5/1958 | Gaddis | 414/523 |
| 3,122,251 | 2/1964 | Gardipee | |
| 3,184,980 | 5/1965 | Schell | 212/245 X |
| 3,430,503 | 3/1969 | McLaughlin | 212/245 X |
| 4,799,850 | 1/1989 | Petitto, Sr. et al. | 414/687 |
| 4,834,463 | 5/1989 | Nye | 414/523 X |
| 5,044,867 | 9/1991 | Pettijohn | 414/523 |

FOREIGN PATENT DOCUMENTS

| | | | |
|---|---|---|---|
| 671067 | 9/1963 | Canada | 414/523 |
| 87685 | 11/1959 | Denmark | 414/744.2 |
| 1592032 | 7/1981 | United Kingdom | 414/523 |

*Primary Examiner*—Frank E. Werner
*Attorney, Agent, or Firm*—Richard C. Litman

[57] ABSTRACT

This invention relates to an improvement over a prior art mobile hydraulic conveyor apparatus which is mounted on the rear end of a truck for both vertical and lateral pivoting, as well as vertical storage for transport to different locations. The apparatus is moved vertically by a block and tackle arrangement under hydraulic control. Lateral pivoting is achieved by activation of a pair of hydraulic cylinders which act on the conveyor apparatus to shift the apparatus laterally about a pivot axis extending centrally through a turret connected to the conveyor apparatus and mounted on a turret holder which in turn is pivotally mounted on the rear end of the truck. The turret holder includes a c-ring which is mounted in a circumferential groove formed on the turret. The conveyor apparatus includes two pivotally connected trays which support a hydraulically driven belt which transports material dispersed from the truck to a selected location. During transport the trays may be pivoted upwardly in a folded position by providing hydraulic power to the block and tackle arrangement.

8 Claims, 3 Drawing Sheets

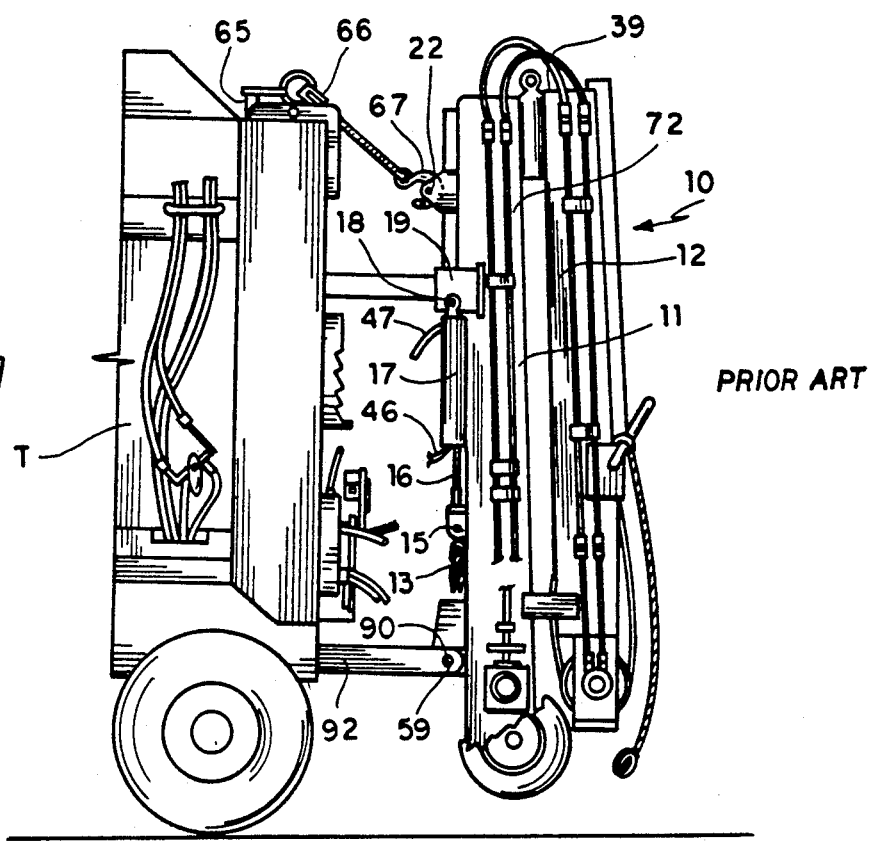
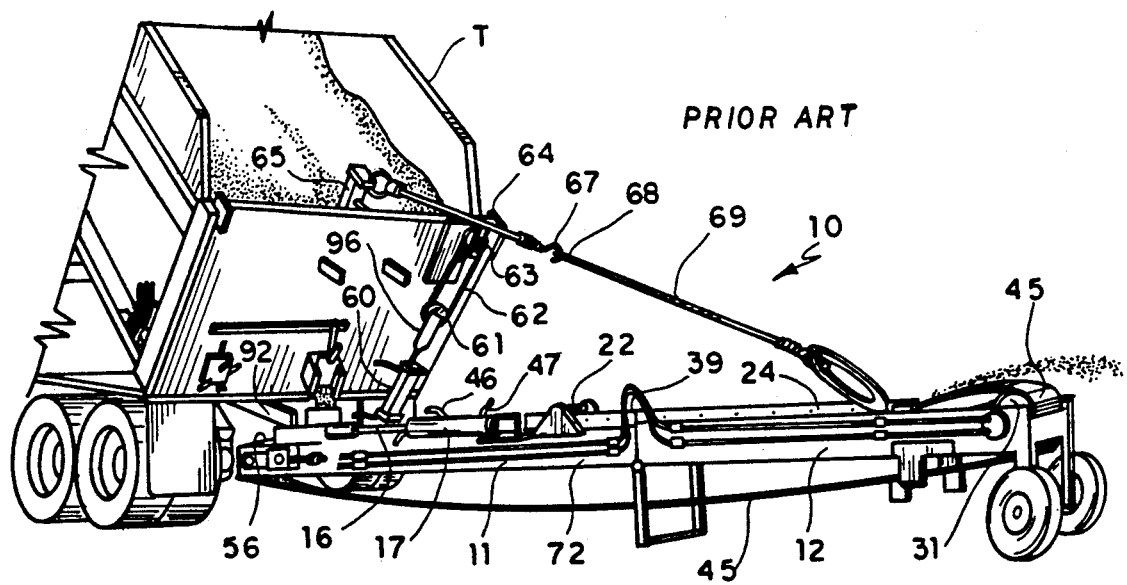
FIG. 1 PRIOR ART
FIG. 2 PRIOR ART

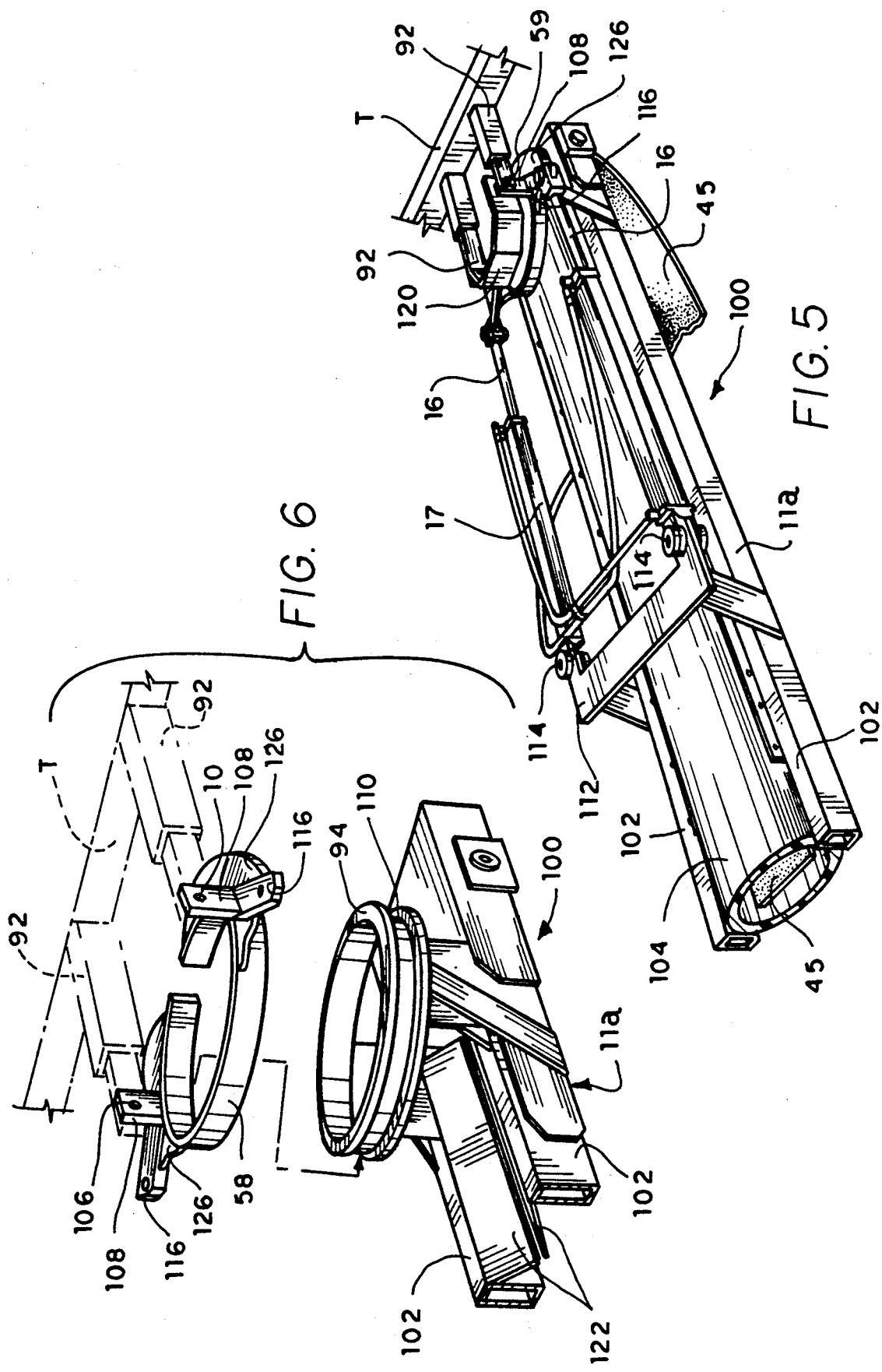

MOBILE HYDRAULIC CONVEYOR

BACKGROUND OF THE INVENTION

1. Field of the Invention

This present invention relates to improvements made on my prior invention disclosed and claimed in my prior application Ser. No. 07/549,071 filed Jul. 6, 1990, which has matured into U.S. Pat. No. 5,044,867, issued Sep. 3, 1991, specifically incorporated herein by reference. More specifically, the improvements relate to the construction of the structural trays, the cover for the conveyor belt mounted on the structural trays, and the apparatus controlling the lateral positioning of the conveyor apparatus.

2. Description Of The Related Prior Art

U.S. Pat. No. 2,609,115, issued to Eli Oklejas on Sep. 2, 1952, U.S. Pat. No. 2,834,487, issued to Roy C. Gaddis on May 13, 1958, and U.S. Pat. No. 3,122,251, issued to Walter E. Gardipee on Feb. 25, 1964 were discussed in my above-identified U.S. Pat. No. 5,044,867. In addition, U.S. Pat. Nos. 2,636,628; 3,521,767; 3,923,175; 3,951,279; and 4,253,256; Canadian Patent No. 671,067; and United Kingdom Patent No. 1,592,032 were also cited but not applied in my above-identified U.S. Pat. No. 5,044,867.

SUMMARY AND OBJECTS OF THE INVENTION

As disclosed in my above-identified U.S. Pat. No. 5,044,867, structural trays 11 and 12 were each formed of two suitably connected I-beams 72 to form a tray for guiding conveyor belt 45. Additionally, a conveyor cover 24 was provided over the length of both structural trays 11 and 12 to prevent the material on conveyor belt 45 from being ejected before it reached end roller 31. The lateral positioning of the conveyor belt apparatus was controlled by the selective activation of two side hydraulic cylinders 17 attached to I-beam 72 by an attachment plate 19 and an eyelet arrangement 18, and suitably connected by chain 13 to turret holder 58, whereby the apparatus 10 is laterally swung in one direction or the other depending on the selective operation of one or the other of the hydraulic cylinders 17.

In the improved arrangement, steel tubes having a rectangular cross-section are substituted for the I-beams 72. A bottom plastic cover member is provided to prevent the material carried by conveyor belt 45 from falling to the ground. A plastic conveyor cover is substituted for cover 24 to prevent the material on conveyor belt 45 from being prematurely ejected. In the apparatus controlling the lateral positioning of conveyor apparatus 10, a direct connection of hydraulic cylinders 17 to the turret holder 58 is substituted for the chain connection disclosed in my above-identified U.S. Pat. No. 5,044,867.

Accordingly, it is an object of my present invention to improve and strengthen the construction of my "Mobile Hydraulic Conveyor".

It is a further object of my present invention to improve the protective cover arrangement of my "Mobile Hydraulic Conveyor".

It is another object of my present invention to improve the lateral positioning apparatus of my "Mobile Hydraulic Conveyor".

Other objects, features and advantages of this invention will become apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 1 is a side view of the prior art conveyor apparatus shown in the folded position behind the truck.

FIG. 2 is a perspective view of the prior art conveyor apparatus shown in the operating position.

FIG. 5 is a partial perspective view of the improved conveyor apparatus.

FIG. 6 is an exploded perspective view of the turret mounting.

DETAILED DESCRIPTION OF THE PREFERRED EMBODIMENT

Figures 3, 4:
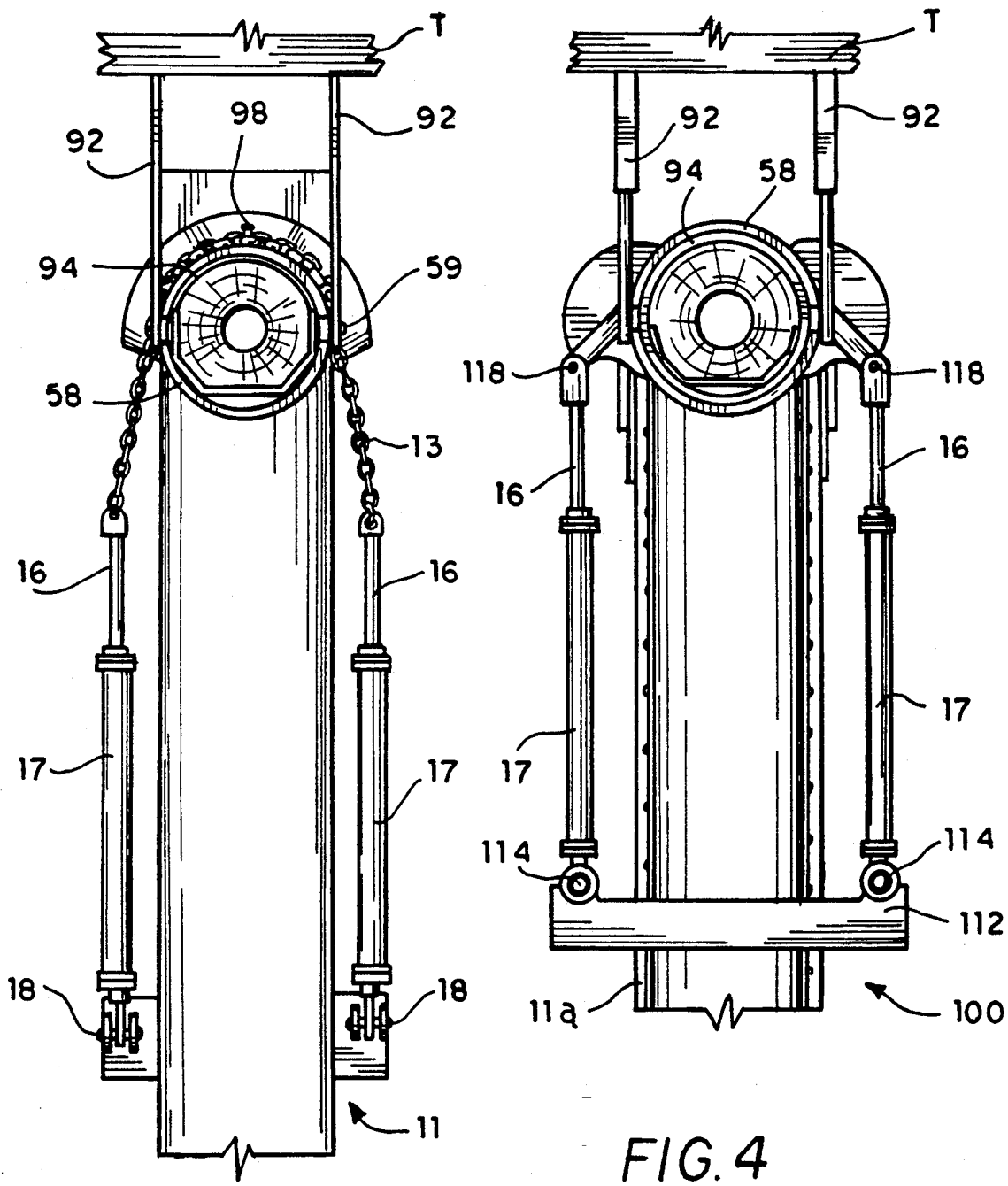
FIG. 3 is a top view showing the prior art chain connection with the turret holder for effecting lateral movement of the conveyor apparatus.
FIG. 4 is a top view of the improved connection between the improved conveyor apparatus and the turret holder.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

FIGS. 1, 2 and 3 show my prior mobile hydraulic conveyor disclosed and claimed in my prior U.S. Pat. No. 5,044,867 issued Sep. 3, 1991, incorporated herein by specific reference. As shown, the prior art conveyor apparatus 10 is essentially composed of two main structural members, an attached structural tray 11 which is attached to a truck T in a manner to permit both vertical pivoting and lateral movement of conveyor apparatus 10 relative to truck T, and a foldable structural tray 12 which is attached to structural tray 11 at a transverse pivot or folding joint 39.

Structural trays 11 and 12 are composed each of two I-beam members 72 which provide a rigid structural support for the various components of the conveyor apparatus 10. Structural tray 11 is pivotally mounted by horizontal pivot pin 59 which is parallel to the back of truck T, pin 59 passing through holes 90 provided in bars 92 fixed to and extending perpendicularly from the rear of truck T. Bars 92 support a turret holder 58 carrying a turret 94 which supports conveyor apparatus 10 for lateral movement. The lateral movement is achieved by two independently operated side hydraulic cylinders 17 pivotally mounted on a structural attachment plate 19 by eyelets 18, there being one structural attachment plate 19 on each side of the attached structural tray 11 integral with the respective I-beam 72. The eyelets 18 are affixed to plates 19 to compensate for any vertical displacement of the conveyor apparatus.

Each side hydraulic cylinder 17 has a piston 16 connected by an eyelet 15 to one end of a chain 13, the central portion of which is fixedly connected to turret holder 58. To shift conveyor apparatus laterally, one or both of the hydraulic cylinders 17 are actuated in opposing fashion such that one piston 16 is extended while the other piston is retracted, thereby establishing coacting forces at eyelets 18 to laterally swing conveyor apparatus 10 about the axis of rotation of turret 94. Chain 13 is connected to turret holder 58 by pin 98 as shown in FIG. 3.

Vertical shifting of conveyor apparatus 10 is achieved by a block and tackle arrangement 61,63 and a hydraulic cylinder 60. Cable 62 extends around a pulley 66 connected to a vertical pole 65 attached to the rear of truck T, around the pulleys 64 of the block and tackle arrangement 62,63 which extends vertically from height cylinder 60. One of the free ends of cable 62 attaches to the piston 96 of height cylinder 60. The other free end of cable 62 has a hook 67 which may be selectively connected either to a connecting rod 22 on structural tray 11 to retain trays 11 and 12 in a folded vertical position as in FIG. 1, or to a loop 68 of a fixed length cable 69 attached to structural tray 12 to retain trays 11 and 12 in the operating position, as in FIG. 2.

Conveyor apparatus 10 includes a movable belt 45, which passes over a motorized roller 31. Hydraulic cylinders 17, 60, and motorized roller 31 are connected to hydraulic lines fed from truck T. Belt 45 is covered by a conveyor cover 24 which prevents material on belt 45 from being ejected before the material reaches motorized roller 31.

Further description of the prior art mobile hydraulic conveyor apparatus 10 can be found in my earlier U.S. Pat. No. 5,044,867.

My improved conveyor apparatus 100, shown in FIGS. 4, 5 and 6, comprises tube steel side beams 102 substituted for I-beam members 72, a plastic cover 104 which completely covers the outgoing portion of belt 45 and which is substituted for cover 24, and a direct connection between the side hydraulic cylinders 17 and turret holder 58, substituted for the indirect connection involving claim 13. The several modifications are further discussed below.

In FIG. 6, the turret mounting is shown in an exploded perspective view. Turret holder 58 is shown to be C-shaped in configuration and is mounted on extendable bars 92 by pivot pins 59 passing through holes 106 formed in vertical ears 108 integral with turret holder 58, and holes 90 in bars 92. Turret holder 58 rides in a groove 110 formed in turret 94 attached to tray 11a through tubular side beams 102.

Hydraulic cylinders 17 are pivotally mounted on a cross bar 112 as at pivot pins 114. Piston 16 is pivotally connected to horizontal ears 116 on turret holder 58 through pivot pins 118. Cross bar 112 is fixedly connected to tray 11a at tubular side beams 102. Mounted on turret 94 for movement therewith is a guard 120 which helps to direct the material being disbursed from truck T into the central opening 122 in turret 94 onto belt 45. Hydraulic cylinders 17 are connected to the hydraulic system of truck T through supply line 46 and return line 47.

In operation, hydraulic cylinders 17, when actuated, act on cross bar 112 and fixed horizontal ears 116 to laterally move conveyor apparatus 100 about the axis of rotation of turret 94 which is perpendicular to the plane of turret 94.

Support for the material carrying portion of belt 45 can be sloped plastic guide plates 122 as shown in FIG. 6, or a plastic cover arrangement 104 as shown in FIG. 5, which replaces cover 24 in the prior art conveyor apparatus 10.

While it will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

I claim:

1. A mobile hydraulic conveyor apparatus pivotally attachable to a rear end of a truck and operable to convey material from said truck to a specific location, said conveyor apparatus being pivotally mounted for both vertical and lateral movement, said conveyor apparatus including a first and second tray, said first tray being fixed at one end to a turret holder, said turret holder being pivotally mounted by a pivot pin on bars extending from said rear end of said truck, said second tray being pivotally connected to said first tray at a second end of said first tray, hydraulic means for raising and holding said first and second trays in a vertical position adjacent said truck rear when transporting said first and second trays from one location to another, said hydraulic means enabling said trays to be straightened substantially parallel to ground so as to extend a free end of said second tray away from said truck rear end, and a conveyor belt mounted on an end roller and a hydraulically driven motorized roller, whereby material discharged from said truck is moved by said conveyor belt to said specific location, the improvement comprising:

a turret connected to said one end of said first tray and pivotally mounted in said turret holder;

a pair of hydraulic cylinders pivotally connected to a cross bar transverse to and integral with said first tray, said hydraulic cylinders being mounted one on each end of said cross bar;

said pair of hydraulic cylinders each having a piston pivotally connected to a respective ear extending transversely to an integral with said turret holder;

said hydraulic cylinders being connected to a hydraulic system on said truck;

whereby said hydraulic cylinders, when activated, act on said cross bar and said transverse ears on said turret holder to shift said free end laterally about a vertical pivot axis of said turret.

2. A mobile hydraulic conveyor apparatus as in claim 1, the improvement further comprising:

tubular side beams forming a frame for said first tray and said second tray, said side beams being suitably connected by a means for connecting including said cross bar, said end roller and said motorized roller.

3. A mobile hydraulic apparatus as in claim 2, said improvement further comprising:

a lower plastic guide plate on said first and second tray providing support for an operative portion of said conveyor belt as said conveyor belt moves material from said truck to a selected location; and a plastic cover covering said operative portion of said conveyor belt on said first and second tray.

4. A mobile hydraulic conveyor apparatus as in claim 3, wherein:

said turret includes a circumferential groove; and said turret holder includes a c-ring mounted in said circumferential groove, a plate integral with said turret holder extending perpendicularly to said vertical pivot axis of said turret and integral with said transverse ears, and a pair of vertical ears extending parallel to said vertical pivot axis, said pair of vertical ears receiving said pivot pin pivotally mounting said turret holder on said bars extending from said rear end of said truck.

5. A mobile hydraulic conveyor apparatus as in claim 2, wherein:
   said turret includes a circumferential groove; and
   said turret holder includes a c-ring mounted in said circumferential groove, a plate integral with said turret holder extending perpendicularly to said vertical pivot axis of said turret and integral with said transverse ears, and a pair of vertical ears extending parallel to said vertical pivot axis, said pair of vertical ears receiving said pivot pin pivotally mounting said turret holder on said bars extending from said rear end of said truck.

6. A mobile hydraulic conveyor apparatus as in claim 1, said improvement further comprising:
   a lower plastic guide plate on said first and second tray providing support for an operative portion of said conveyor belt as said conveyor belt moves material from said truck to said specific location; and
   a plastic cover covering said operative portion of said conveyor belt on said first and second tray.

7. A mobile hydraulic conveyor apparatus as in claim 6, wherein:
   said turret includes a circumferential groove; and
   said turret holder includes a c-ring mounted in said circumferential groove, a plate integral with said turret holder extending perpendicularly to said vertical pivot axis of said turret and integral with said transverse ears, and a pair of vertical ears extending parallel to said vertical pivot axis, said pair of vertical ears receiving said pivot pin pivotally mounting said turret holder on said bars extending from said rear end of said truck.

8. A mobile hydraulic conveyor apparatus as in claim 1, wherein:
   said turret includes a circumferential groove; and
   said turret holder includes a c-ring mounted in said circumferential groove, a plate integral with said turret holder extending perpendicularly to said vertical pivot axis of said turret and integral with said transverse ears, and a pair of vertical ears extending parallel to said vertical pivot axis, said pair of vertical ears receiving said pivot pin pivotally mounting said turret holder on said bars extending from said rear end of said truck.

* * * * *